June 16, 1964 R. D. HERSHEY 3,137,815

METHOD AND APPARATUS FOR TESTING PRINTED WIRING PANELS UTILIZING AN OVERLAY SHEET HAVING TEST APERTURES AND PICTORIAL TEST INFORMATION

Filed March 3, 1960 2 Sheets-Sheet 1

INVENTOR.
RICHARD D. HERSHEY
BY
Carl H. Seymestvedt
AGENT

INVENTOR.
RICHARD D. HERSHEY
BY
Carl H. Aymestvedt
AGENT

United States Patent Office 3,137,815

Patented June 16, 1964

3,137,815

METHOD AND APPARATUS FOR TESTING PRINTED WIRING PANELS UTILIZING AN OVERLAY SHEET HAVING TEST APERTURES AND PICTORIAL TEST INFORMATION

Richard D. Hershey, Riverton, N.J., assignor, by mesne assignments, to Philco Corporation, Philadelphia, Pa., a corporation of Delaware Filed Mar. 3, 1960, Ser. No. 12,610

5 Claims. (Cl. 324—158)

This invention relates broadly to apparatus for testing electronic equipment and more particularly to improved means for servicing wiring assemblies of the so-called "printed" type, that is, circuit panels having circuit elements on one side thereof and a pattern of conductive paths applied to the opposite side thereof.

A problem of increasing difficulty in the electronic art is that of servicing and maintaining the present day complex of electronic equipment. This problem has been accentuated by the widening use of printed wiring circuitry which has made possible a substantial increase in component density. This development, coupled with the increased use of miniaturized components has complicated the repair of units incorporating these refinements, with the result that there has been a disproportionate rise in repair cost.

One area in which this problem is particularly acute is in the servicing of transistorized radios. The fact that such sets are relatively inexpensive, plus the fact that they incorporate the latest designs for achieving the ultimate in compactness, serves to further compound an already difficult situation. In such units, large servicing costs are particularly onerous because of the low initial cost of such equipment.

To fully illustrate the application of the fixture which comprises this invention to the repair of complex printed wiring circuitry, its use in the servicing of electronic equipment in the critical area of transistorized radios will be illustrated and described, it being understood that this particular application is merely illustrative of the invention and not exhaustive thereof.

Accordingly, and with the foregoing qualification in mind, the primary object of this invention is to provide simple, inexpensive means permitting rapid servicing of intricate and complex electronic assemblies embodying printed wiring circuitry.

Another object of this invention is to provide a testing aid which permits the repair of electronic equipment by other than highly skilled and specialized technicians.

Still another object of this invention is to provide a device for use in the repair of printed wiring assemblies which minimizes the need for auxiliary test data, is simple to use, and permits the repair of such assemblies in minimal time.

These, and other objects and features of the present invention will be apparent from a consideration of the following detailed description, taken in conjunction with the accompanying drawings, in which.

In achievement of the previously mentioned general objectives and features there is provided a novel test fixture having specific and particular application to electronic assemblies employing printed wiring circuitry. This fixture or template comprises a sheet-like member adapted to overlay the conductive side of the printed wiring panel and has on its upperwardly presented surface a pictorial representation of active and critical circuit elements which are interrelated by a graphically represented test pattern coded to visually indicate the desired sequence of operations prescribed for that particular printed wiring assembly. Critical test points on the printed wiring are readily accessible by means of holes punched in the template associated with each of the pictorially represented elements. These testing apertures are automatically brought into registration with the underlying circuit on indexing of the test fixture on the printed wiring panel. The use of such a template prevents confusion by covering all incidental circuitry, and facilitates servicing by graphically illustrating the prescribed testing procedure and by simplifying the act of locating major test points. Further, by extracting only essential information from trouble shooting charts and circuit diagrams and by placing this body of information in convenient form at strategic locations on the trouble shooting overlay, the testing procedure can be carried out in substantial part without recourse to other than the test panel. This novel means of servicing thus permits efficient and effective repair of the major causes of electronic malfunctioning with minimal preliminary preparation and with optimum economy of time.

This invention has particular significance in the repair of printed wiring circuitry because of the nondescript nature of such circuitry. This type circuit provides little if any information from which the identification of elements can be gleaned and has a maximum of similarity between test points.

With the overlay in place, however, critical test points may be readily monitored by simply inserting a test probe through the appropriate aperture which is pictorially associated with the circuit element being tested. These holes are made sufficiently small to restrict movement of the test probe when inserted therethrough to insure accurate placement of the probe on the exact point under test. Printed on the overlay next to each active element, namely, elements such as transistors, tubes, amplifiers, oscillators, and rectifiers, is the essential test data indicative of that element's proper functioning.

Figures 1, 2, 3:
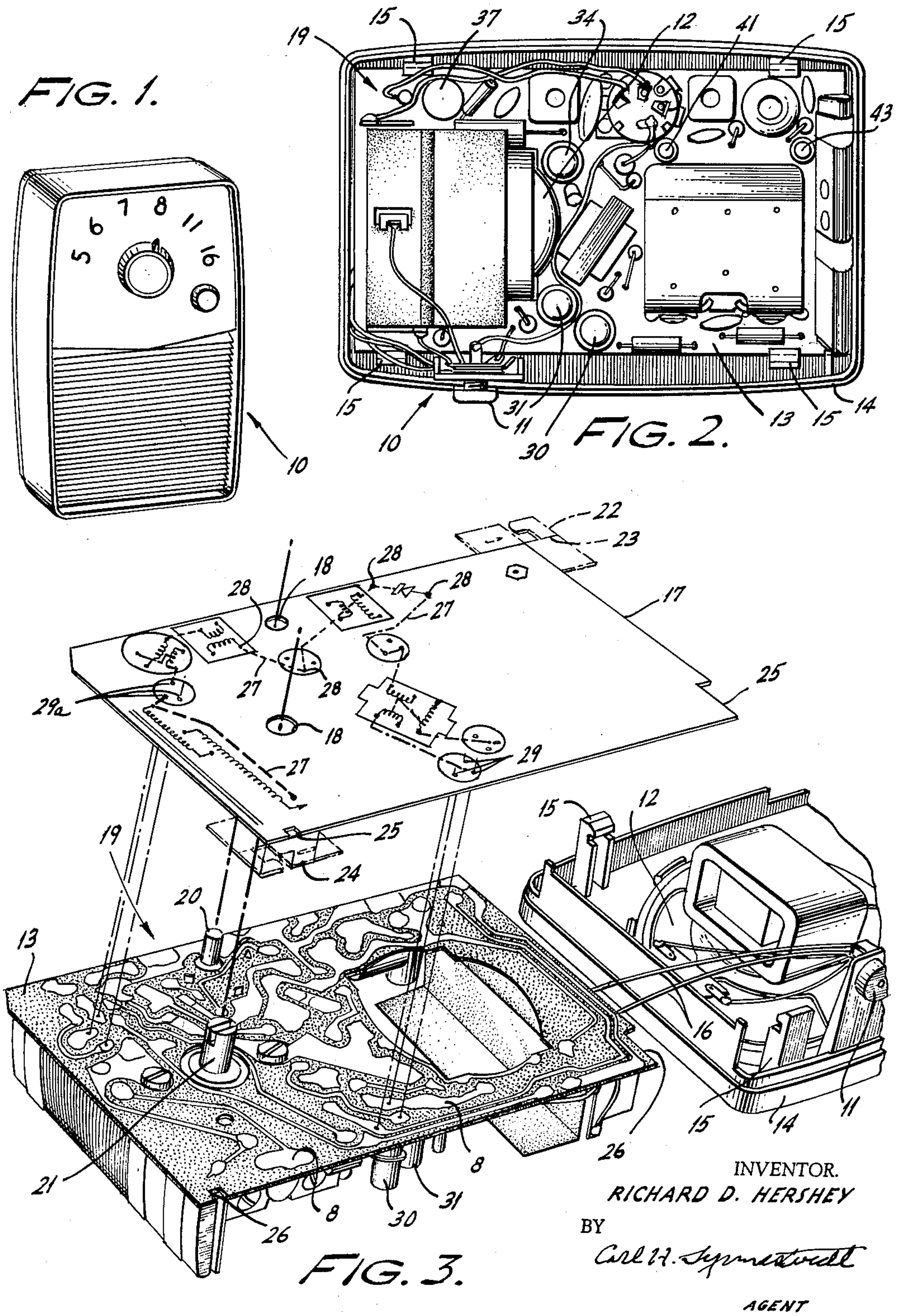
FIGURE 1 is a perspective view of a transistorized radio incorporating printed wiring circuitry.
FIGURE 2 is a rear elevational view of the radio shown in FIGURE 1, with the back cover removed.
FIGURE 3 is an exploded view showing the transistor radio of FIGURE 1 with the printed wiring chassis removed from the case and the trouble shooting overlay or test fixture comprising this invention, in its poised position prior to placement on the conductive path side of the printed wiring board chassis.

Referring to the drawing there is shown in FIGURE 2 a chassis of a transistorized radio 10. The maze of electronic components comprising this unit, with the exception of the phonojack 11 and speaker 12 are mounted on a common printed wiring board 13. In the event of radio malfunctioning the first repair step is preferably to make the following preliminary investigation: check batteries, battery contacts, inspect the printed wiring panel for cracks, or open circuitry, check for an open switch or a shortened tuning gang plate and check for loose antenna and speaker connections. If these preliminary checks fail to disclose the trouble, it then becomes necessary to check the electronic circuitry in greater detail. A novel and expedient means for carrying out this detailed check is described hereinafter.

To permit access to the conductive path 8 of the printed wiring board in the embodiment illustrated, the assembly 19 is removed from its plastic housing 14 by disengaging the printed wiring board 13 from the frictional retaining lugs 15. There is sufficient length of wire 16 connecting the assembly 19 to the speakers and jack to permit the printed wiring assembly to be taken out of the case and turned over exposing the conductive paths 8 of the printed wiring panel in the manner shown in FIGURE 3.

With the chassis thus positioned the testing fixture or trouble shooting overlay 17, which is desirably made from plasticized card stock, is brought into registration with the conductive side of the printed wiring board 13 by means of aligning apertures 18 adapted to mate with the volume control shaft 20 and tuning shaft 21. In the event that this method of alignment does not provide the desired degree of accuracy, corner tabs 22 may also be used. These tabs are desirably formed as an integral part of the overlay and may be perforated or creased as at 23 to facilitate their being folded into a closed L-shaped corner structure as shown in full lines at 24. As an alternative construction the template may be simply visually indexed with the printed wiring board by aligning keying notches 25 on the fixture with corresponding notches 26 on the printed wiring board, or alternatively by simply lining up edge portions of the fixture with corresponding edge portions of the printed wiring board.

In the case of transistorized radios experience has shown that, excluding the more obvious causes of malfunctioning such as those listed previously under preliminary checks, 98% of the trouble is caused by a bad transistor, transformer or an open filter. Accordingly, the most effective method of repair is to pictorially represent these critical elements operatively associated by means of the prescribed testing procedfure designed most effectively to isolate the malfunctioning part. In the illustrated case the prescribed testing procedure is that of signal tracing.

Figure 4:
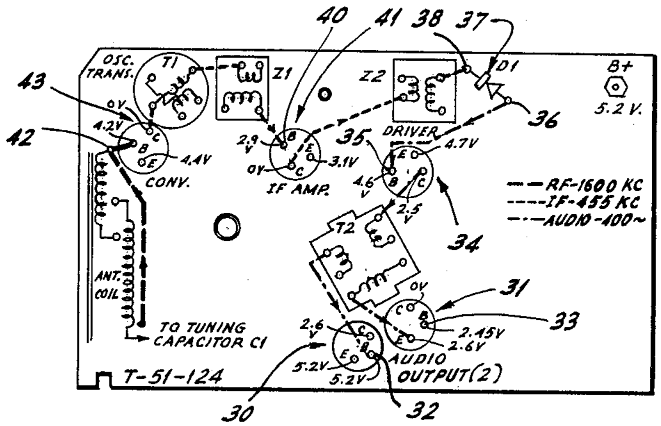
FIGURE 4 is a plan view of the fixture in operating registry with the printed wiring board.

By eliminating superfluous information and showing only the essential nucleus of the system, comprised of critical elements whose operating relationship is graphically depicted in terms of the desired test procedure, the simplified form of testing template shown in plan view in FIGURE 4 is achieved. By emphasizing the practical aspects of testing and by consolidating essential test data the heretofore tedious and complex job of circuit testing has been transformed into a relatively simple procedure.

One of the most expedient ways of localizing the cause of transistor radio malfunctioning is by signal tracing. Accordingly, in this instance the critical elements of the set are graphically interrelated by a signal tracing path 27 which through appropriate means, such as color coding or by the illustrated use of line coding, coupled with directional arrows, indicates both the generally preferred testing sequence and the type of signal to be injected at various locations in the set. To facilitate signal injection, the template is provided with a plurality of apertures 28 which are accurately aligned with actual test points on the underlying chassis when the template is brought into registry with the printed wiring board. This feature is graphically illustrated in FIGURE 3 by showing the projected alignment of typical test apertures 29 and 29*a* with points on the printed wiring circuit. Test apertures 29 are associated with one of the audio output transistors 30 while the other illustrated grouping 29*a* is associated with the converter 43. All critical elements are clearly identified on the test fixture as depicted in FIGURE 4. To better show the physical correspondence of parts the five transistors and diode comprising the illustrated set are identified in each of FIGURES 2, 3, 4 and 5. The test apertures, as indicated previously, are made small enough so that movement of the test probe when inserted through the hole is sufficiently restricted to prevent contact with other than the intended point of signal injection or test. By this novel arrangement of testing aids one can clearly see the cooperation of essential circuit elements and their function in the overall operation of the system.

Figure 5:
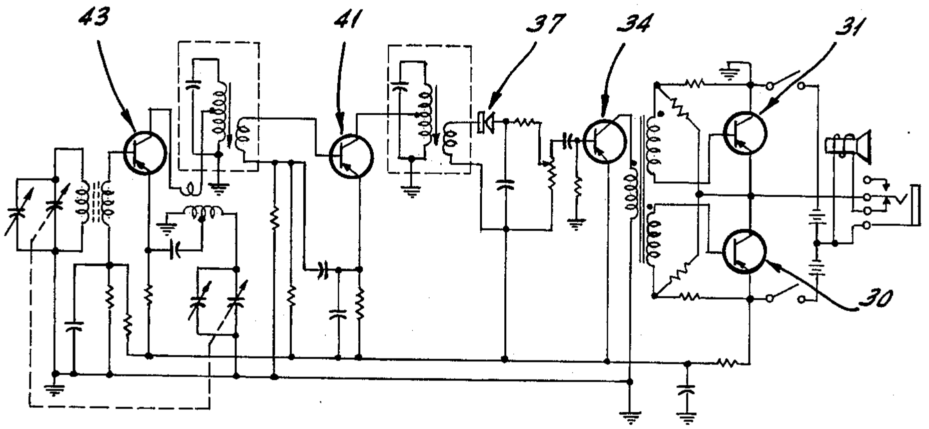
FIGURE 5 is a preliminary schematic diagram of the type generally used by service technicians in the repair of transistorized radios.

Normally there is available a schematic diagram of the type shown in FIGURE 5 which provides little if any indication of the actual location of circuit components and no suggestion as to the appropriate test procedure most advantageously to be employed in localizing the major causes of set malfunctioning. In this latter respect the person testing the unit has only his own experience to rely upon which in many instances is totally inadequate to permit economic repair of the complex and intricate circuitry making up the vast majority of present day electronic assemblies.

While, in accordance with my invention, numerous approaches may be employed in signal tracing, one useful method is to begin at the speaker end of the set and work back towards the antenna. Before beginning detailed testing of the circuitry speaker operation can be simply checked by injecting an audio signal, for example 400 cycles, using a conventional signal generator, between ground and the collector test point (*c*) of transistor 30 which in the illustrated circuit, see FIGURE 5, is one of a matched pair of transistors comprising the push-pull output stage.

After making all of the preliminary checks previously listed, the first step in the detailed testing procedure is to check the audio output transistors 30 and 31, see FIGURE 4, by injecting an audio signal, of the same level used in testing of the speaker, at base test points 32 or 33 of either of these active elements and listening for a relatively distortionless audio tone indicative of proper push pull operation. The driver 34 and circuit continuity from the driver to the speaker are then checked by injecting an audio signal at the base test point 35 of driver 34. Injection of this audio signal at the output 36 of detector 37 completes the test of the entire audio portion of the circuit.

To test operation of the detector itself an audio modulated IF signal is inserted at the detector input 38. If the detector is functioning properly a clear audio tone will be heard. Next, this modulated IF signal is injected into the base test point 40 of the IF amplifier 41 to monitor its operation and give a gross indication of gain. To test both circuit continuity of the IF stage and the IF gain of the converter an audio modulated IF signal is injected at point 42, the base of converter 43. This particular transistor serves in the triple capacity of an IF amplifier, mixer, and oscillator, the last two functions being easily checked by injecting an audio modulated RF signal at test point 42. If the converter is operating properly an audio output at the speaker will indicate proper heterodyning action. By using the circuit overlay in this manner the defective stage may be quickly isolated. To pinpoint the exact cause of trouble, various voltage and continuity readings of elements in the suspected area may then be made and the readings compared against the check values printed contiguous each appropriate test point. This test data can be seen in FIGURE 4. Testing of critical passive elements such as coils is provided for, by terminating the end points of the pictorially represented member in test apertures providing access to the actual end points of the coil on the chassis underlying the test panel. Each of the elements found by experience to be trouble prone are thus segregated and made available for testing in this manner in the event the area in which they are located becomes suspect. It will of course be recognized that, where desirable, the overlay may be provided with other information necessary for effective servicing of the equipment under repair, it being understood that the illustrated embodiment shows only one of many possible forms of a trouble shooting overlay predicated on the teachings of this invention.

In summary, I have provided a unique device for the repair of printed wiring assemblies through a novel consolidation of essential test information graphically set out on a sheet like overlay designed to be placed in registry with the printed wiring circuitry under test. Pictorially represented on this overlay is the most advantageous test procedure to be employed in a particular application which procedure is drawn to integrate critical circuit elements whose identification and essential operating parameters are graphically depicted and whose test points are physically located on placement of the overlay on the printed wiring circuit. By this simple and direct means a vast majority of defective units of a particular type may be repaired without resort to other than a single testing template of the type illustrated and described.

In order to avoid any possible future ambiguity, it is applicant's intent when using the term "panel" in claim recitations, unless the context clearly indicates otherwise, to connote not only the printed wiring panel 13 per se, but the parts physically associated therewith such, for example, as the volume control shaft 20 and tuning shaft 21 shown in FIGURE 3 of the drawing.

Although the invention has been disclosed with particular reference to specific practice and embodiments, it will be understood by those skilled in the art that the apparatus of the invention may be changed and modified without departing from the essential scope of the invention, as defined in the appended claims.

I claim:

1. A testing fixture for a printed wiring panel having circuit elements on one side thereof and a pattern of conductive paths on the opposite side thereof, said fixture comprising a sheet-like member shaped and dimensioned and having tab portions cooperable with edge portions of said panel under test to facilitate accurate placement of said test fixture directly upon and in registry with said panel, and having pictorially indicated thereon the desired testing sequence and procedure, said member also being provided with apertures which communicate directly with actual points on said conductive paths for purposes of signal injection and test on registration of said member with said panel, and said member having disposed thereon contiguous said apertures information indicative of the normal functioning of circuitry and elements subject to test.

2. A testing fixture for a wiring panel having circuit elements on one side thereof and a pattern of conductive paths on the opposite side thereof, said fixture comprising a sheet-like member shaped and dimensioned and having means cooperable with the panel under test comprising a combination of tab and cut-out portions whereby to facilitate placement of said fixture directly upon and in registry with the conductive surface of said panel and having pictorially indicated thereon the desired testing sequence and procedure, said member also being provided with apertures which communicate directly with actual points on said conductive paths for purposes of signal injection and tests on registration of said member with said panel, and said member having disposed thereon contiguous said apertures information indicative of the normal functioning of circuitry and elements subject to test.

3. The method of testing a printed wiring assembly of the type having a pattern of conductive paths on one side thereof interconnecting a plurality of circuit elements carried by said panel, which comprises; providing a sheet-like member having a plurality of test apertures constructed and arranged to afford access to actual points on said conductive paths for purposes of signal injection and test on alignment of said member with said panel and having disposed thereon a pictorial representation of critical circuit elements of said assembly interconnected by a prescribed testing sequence and procedure designed for the effective trouble shooting of said assembly and having also contained thereon information correlated with individual test apertures indictaive of the normal functioning of circuitry and elements subject to test; disposing said sheet-like member directly upon and in predetermined registration with said panel whereby to align said test apertures with actual points on said conductive paths; and inserting test apparatus through said apertures and into contact with actual points on said conductive paths for purposes of signal injection and test.

4. As a new combination: a printed wiring panel of the type having conductive paths on one side thereof interconnecting a plurality of circuit elements carried by said panel on the opposite side thereof; and a fixture directly overlying and carried by said one side of said printed wiring panel in contact therewith and comprising a sheet-like member provided with a plurality of test apertures through which a test probe may be inserted into direct electrical contact with actual points on said conductive paths for purposes of signal injection and test, said fixture further having cut-out portions interfitting with components carried by said panel and insuring placement of said test apertures directly over and in predetermined alignment with test points on said conductive paths, said fixture depicting the desired testing sequence and procedures, and having thereon information correlated with individual test apertures and indicative of the normal functioning of circuits and elements subject to test.

5. A fixture for testing printed wiring panels of the type having circuit elements on one side thereof and a pattern of conductive paths on the opposite side thereof, comprising: a sheet-like member shaped and dimensioned to overlie and be carried by one side of the printed wiring panel to be tested, and having a plurality of test apertures provided therein shaped and disposed to align the probe of a test instrument with a pedetermined location on particular ones of said conductive paths on alignment of said member with said panel, and said member having registration means associated therewith, including at least one opening therein in addition to said test apertures, cooperable with component means associated with said panel to facilitate placement of said fixture directly upon and in registry with surface portions of said conductive paths, said member having pictorially indicated thereon the desired testing sequence and procedure, and said member further having disposed thereon, contiguous said test apertures, information indicative of the normal functioning of circuits and elements subject to test.

References Cited in the file of this patent

UNITED STATES PATENTS

| | | |
|---|---|---|
| 2,844,250 | Bayha et al. | July 22, 1958 |
| 2,857,558 | Fiske | Oct. 21, 1958 |
| 2,882,618 | Thompson | Apr. 21, 1959 |
| 2,887,622 | Rayburn et al. | May 19, 1959 |
| 2,918,648 | Ludman et al. | Dec. 22, 1959 |

OTHER REFERENCES

Formica, Proceedings of the IRE, December 1955; page 39A.

Kingan: Electronic Circuit Trainer, RCA Technical Notes, No. 314, November 1959, sheets 1 and 2.